US012100006B2

(12) United States Patent
Moreno et al.

(10) Patent No.: US 12,100,006 B2
(45) Date of Patent: Sep. 24, 2024

(54) PREVIOUS SOURCE INPUT RETURN

(71) Applicant: ARRIS Enterprises LLC, Suwanee, GA (US)

(72) Inventors: Cesar Moreno, Santa Rosa Beach, FL (US); Navneeth Kannan, Doylestown, PA (US); William Ryan, Los Angeles, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/722,559

(22) Filed: Apr. 18, 2022

(65) Prior Publication Data

US 2022/0377410 A1    Nov. 24, 2022

Related U.S. Application Data

(60) Provisional application No. 63/192,182, filed on May 24, 2021.

(51) Int. Cl.
*G06Q 20/40* (2012.01)
*G06Q 20/02* (2012.01)
(Continued)

(52) U.S. Cl.
CPC ......... *G06Q 20/4016* (2013.01); *G06Q 20/02* (2013.01); *G06Q 20/10* (2013.01);
(Continued)

(58) Field of Classification Search
None
See application file for complete search history.

(56) References Cited

U.S. PATENT DOCUMENTS

| 2006/0190633 A1 | 8/2006 | Cantwell et al. |
| 2009/0102971 A1 | 4/2009 | Chang et al. |

(Continued)

FOREIGN PATENT DOCUMENTS

WO     2011/145041     11/2011

OTHER PUBLICATIONS

International Search Report and the Written Opinion of the International Searching Authority dated Jul. 6, 2022 in International (PCT) Application No. PCT/US2022/025166.
(Continued)

*Primary Examiner* — Samira Monshi
(74) *Attorney, Agent, or Firm* — Wenderoth, Lind & Ponack, L.L.P.

(57) ABSTRACT

A control device connected to a media device can autonomously return the active source input of the media device to a previously selected active source input. Any client device within a network may be able to switch the active source input of the media device to the source input associated with the device so as to deliver media content to the media device. Tor return to the previous active source input generally requires user intervention. However, the control device can store the previous active source input of the media device and then, when the media content is terminated or the client device disconnects from the media device, transmit a source input command that causes the media device to cycle through the plurality of source inputs associated with the media device until the active source input is the previous source input without requiring any user intervention.

20 Claims, 6 Drawing Sheets

(51) Int. Cl.
    *G06Q 20/10*     (2012.01)
    *G06Q 20/14*     (2012.01)
    *G06Q 20/22*     (2012.01)
    *G06Q 20/38*     (2012.01)
    *G06Q 40/02*     (2023.01)
    *H04L 67/306*     (2022.01)
    *H04N 21/422*     (2011.01)
    *H04N 21/436*     (2011.01)
    *H04N 21/4363*     (2011.01)

(52) U.S. Cl.
    CPC ........... *G06Q 20/14* (2013.01); *G06Q 20/227* (2013.01); *G06Q 20/382* (2013.01); *G06Q 20/3821* (2013.01); *G06Q 20/3825* (2013.01); *G06Q 20/385* (2013.01); *G06Q 40/02* (2013.01); *H04L 67/306* (2013.01); *H04N 21/42215* (2013.01); *H04N 21/42221* (2013.01); *H04N 21/43615* (2013.01); *H04N 21/43635* (2013.01); *G06Q 20/023* (2013.01)

(56) References Cited

U.S. PATENT DOCUMENTS

| | | | |
|---|---|---|---|
| 2009/0102983 A1 | 4/2009 | Malone et al. | |
| 2010/0013998 A1* | 1/2010 | Mortensen | H04N 21/41265 |
| | | | 348/558 |
| 2013/0033647 A1* | 2/2013 | Yuan | H04N 21/482 |
| | | | 348/731 |
| 2017/0289464 A1* | 10/2017 | Koh | H04N 21/43615 |

OTHER PUBLICATIONS

International Preliminary Report on Patentability issued Nov. 21, 2023 in International (PCT) Application No. PCT/US2022/025166.

\* cited by examiner

410 ↘

| Source Input Identifier (402) | Source Input Name (404) | Active Source Input (406) |
|---|---|---|
| 1 | Antenna In | Not Selected |
| 2 | Coaxial Digital | Selected |
| 3 | HDMI1 | Not Selected |
| 4 | HDMI2 | Not Selected |
| 5 | VGA | Not Selected |
| 6 | Ethernet | Not Selected |
| 7 | DVI | Not Selected |
| 8 | Component | Not Selected |

Active Source Input = 2

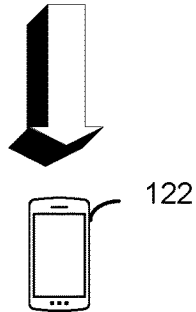

Receive call on smartphone

| Source Input Identifier (402) | Source Input Name (404) | Active Source Input (406) |
|---|---|---|
| 1 | Antenna In | Not Selected |
| 2 | Coaxial Digital | Not Selected |
| 3 | HDMI1 | Not Selected |
| 4 | HDMI2 | Selected |
| 5 | VGA | Not Selected |
| 6 | Ethernet | Not Selected |
| 7 | DVI | Not Selected |
| 8 | Component | Not Selected |

Previous Active Source Input = 2
Current Active Source Input = 4
Active Source Input = 4

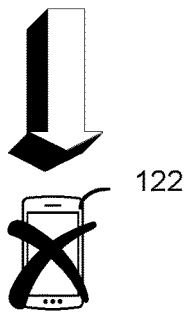

Call terminates on smartphone

| Source Input Identifier (402) | Source Input Name (404) | Active Source Input (406) |
|---|---|---|
| 1 | Antenna In | Not Selected |
| 2 | Coaxial Digital | Not Selected |
| 3 | HDMI1 | Not Selected |
| 4 | HDMI2 | Not Selected |
| 5 | VGA | Selected |
| 6 | Ethernet | Not Selected |
| 7 | DVI | Not Selected |
| 8 | Component | Not Selected |

Previous Active Source Input = 2
Active Source Input = 4
New Source Input = 5

After increment of source input identifier:
Active Source Input = 5

| Source Input Identifier (402) | Source Input Name (404) | Active Source Input (406) |
|---|---|---|
| 1 | Antenna In | Not Selected |
| 2 | Coaxial Digital | Selected |
| 3 | HDMI1 | Not Selected |
| 4 | HDMI2 | Not Selected |
| 5 | VGA | Not Selected |
| 6 | Ethernet | Not Selected |
| 7 | DVI | Not Selected |
| 8 | Component | Not Selected |

Previous Active Source Input = 2
Active Source Input = 1
New Source Input = 2

After increment of source input identifier:
Active Source Input = 2
Previous Active Source Input = 2

FIG. 4D

PREVIOUS SOURCE INPUT RETURN

BACKGROUND

Generally, high-definition multimedia interface (HDMI) devices have the capability to automatically turn on a media device, such as a television, and audio/video receiver (AVR), or both, as well as select the active source input for the media device. While the capability to select the active source input simplifies the experience for the user, a user-friendly mechanism does not exist to return to a previous active input source. Thus, there is a need to autonomously return from a current active source input to a previous active source input without requiring user intervention.

SUMMARY

This disclosure relates generally to controlling the active source input associated with a media device such that the active source input of a media device can be returned or changed from a current active source input to a previous active source input. One or more aspects of the present disclosure discusses an HDMI-consumer electronics control (CEC) enabled device to learn and enumerate the plurality of source inputs supported by a media device so as to provide a simpler mechanism for a user to return the media device to the previous active source input. For example, many network environments include various Internet of Things (IoT) devices that may autonomously alter or change the active source input of a media device to one associated with any IoT device requiring the functionality of the media device so as to provide one or more services to a user, such as any of video conferencing, one or more alerts associated with an audio and/or visual (A/V) device (for example, a security camera), room monitoring, any other A/V service or functionality, or any combination thereof. Returning to a previous active source input without user intervention can be achieved by having an infrared (IR) transmitter generate one or more IR key sequences for the media device to reacquire, return to, or otherwise set to the previous active source input. The IR transmitter can be a remote control device or unit (RCU), an IR blaster on the control device, or both. The one or more IR key sequences can be programmed on the remote control device and/or the control device for access via a single button press by a user or can be automatically generated by the control device that sends a command that comprises the one or more IR key sequences to the remote control device or directly to the media device, for example, via an IR blaster on a remote control unit that is part of or distinct from the media device. In this way, the user experience is enhanced as the user does not have to determine how to return to the previous active video source and costs associated with complaints or poor user experience are lowered as user error in operation of the remote control device is reduced or eliminated.

An aspect of the present disclosure is drawn to a control device to return an active source input of a media device to a previous active source input of the media device. The control device comprises a memory and a processor configured to execute one or more instructions stored on the memory to cause the control device to receive, from the media device, media device information associated with the media device, wherein the media device information comprises a current active source input of a plurality of source inputs of the media device, store the current active source input as the previous active source input, receive, from the media device, additional media device information, determine the active source input has changed to a new source input based on the additional media device information, wherein the additional media device information comprises a new source input as the active source input, and transmit a source input command to the media device based on the new source input, wherein the source input command causes the media device to return the active source input to the previous active source input.

In an aspect of the present disclosure, the source input command comprises a key sequence that causes the media device to change the active source input by incrementing or decrementing an identifier associated with the plurality of source inputs of the media device.

In an aspect of the present disclosure, the processor is further configured to execute the one or more instructions stored on the memory to additionally cause the control device to compare, after transmitting the source input command, the active source input to the previous active source input, and continue transmitting the source input command until the comparison of the active source input to the previous active source input indicates that the active source input is the previous active source input.

In an aspect of the present disclosure, a remote control device coupled to the control device receives the source input command and transmits the key sequence to the media device.

In an aspect of the present disclosure, the media device information is based on a client device connecting to or establishing a communication with the media device.

In an aspect of the present disclosure, the control device comprises an infrared blaster that transmits the source input command to the media device.

In an aspect of the present disclosure, the control device is a high-definition multimedia interface (HDMI) consumer electronics control (CEC) enabled device.

An aspect of the present disclosure is drawn to a method of using a control device to return an active source input of a media device to a previous active source input of the media device. The method comprises receiving, from the media device, media device information associated with the media device, wherein the media device information comprises a current active source input of a plurality of source inputs of the media device, storing the current active source input as the previous active source input, receive, from the media device, additional media device information, determining the active source input has changed to a new source input based on the additional media device information, wherein the additional media device information comprises a new source input as the active source input, and transmitting a source input command to the media device based on the new source input, wherein the source input command causes the media device to return the active source input to the previous active source input.

In an aspect of the present disclosure, the method is such that the source input command comprises a key sequence that causes the media device to change the active source input by incrementing or decrementing an identifier associated with the plurality of source inputs of the media device.

In an aspect of the present disclosure, the method further comprises comparing, after transmitting the source input command, the active source input to the previous active source input, and continuing transmitting the source input command until the comparison of the active source input to the previous active source input indicates that the active source input is the previous active source input.

In an aspect of the present disclosure, the method is such that a remote control device coupled to the control device receives the source input command and transmits the key sequence to the media device.

In an aspect of the present disclosure, the method is such that the media device information is based on a client device connecting to or establishing a communication with the media device.

In an aspect of the present disclosure, the method is such that the control device comprises an infrared blaster that transmits the source input command to the media device.

In an aspect of the present disclosure, the method is such that the control device is a high-definition multimedia interface (HDMI) consumer electronics control (CEC) enabled device.

An aspect of the present disclosure provides a non-transitory computer-readable medium storing one or more instructions for controlling an active source input of a media device. The one or more instructions when executed by a processor coupled to the non-transitory computer-readable medium, cause the control device to perform one or more operations including the steps of the methods described above.

The above-described novel solution may be implemented at a user environment that includes one or more devices, such as any of a control device, a media device, one or more client devices, or any combination thereof, according to one or more aspects of the present disclosure.

Thus, according to various aspects of the present disclosure described herein, it is possible to provide a control device for autonomously returning a media device to a previous active source input. In particular, the novel solution provides improvements to switching between source inputs so as to return an active source input of a media device from a current active source input to a previous active source input without requiring user intervention.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIGS. 4A-4D illustrate returning an active source input from a current source input to a previous source input, according to one or more aspects of the present disclosure.

DETAILED DESCRIPTION

All types of media devices are a ubiquitous part of today's households and offices. For example, a media device, such as a television, multi-media player, etc., can be connected to one or more devices, for example, a control device, such as a set-top box (STB), an IoT device, such as any of a smartphone, a streaming device, a gaming console, a laptop, a terminal, any other IoT device, any other service provider device that provides media content, or any combination thereof, so as to receive media content for playback at the media device. An active source input of a media device can be switch or changed based on the connection of one or more devices to the media device. Generally, high-definition multimedia interface (HDMI) connected devices have the capability to automatically turn on a television/audio visual receiver (TV/AVR) as well as select a device as the active video source to be presented on the TV. While the capability to select the active source greatly simplifies the experience for the user, there is no particularly good mechanism for the user to go back to a previous video source. According to one or more aspects of the present disclosure, an HDMI-CEC enabled device to learn and enumerate a plurality of source inputs supported by the TV/AVR to provide simpler mechanism for the active source input to be returned to the prior active. Thus, to provide a user with an improved and seamless experience, the active source input can be returned or switched to a previous active source input such that the state of the media device is returned to the state prior to interruption by connection of another device, for example, media content received via a control device, such as a STB. For example, a user can be watching a program on a first source input (the current active source input) when an IoT device receives a request to join a teleconference. A control device connected via an HDMI connection to the media device can either switch or determine that the IoT device has switched the active source input to the source input associated with the IoT device so that the teleconference (or data) can be received by the media device, for example, the media content can be presented by the media device (such as to display the media content), provide an interactive session (for example, a teleconference), or any other consumption of the media content by the media device. However, when the media content has terminated or the IoT device has otherwise disconnected from the media device, the active source input does not return to the previous active source input. One or more aspects of the present disclosure provide for a control device that autonomously returns the active source input to the previous active source input to provide a user with an improved experience.

Figure 1:
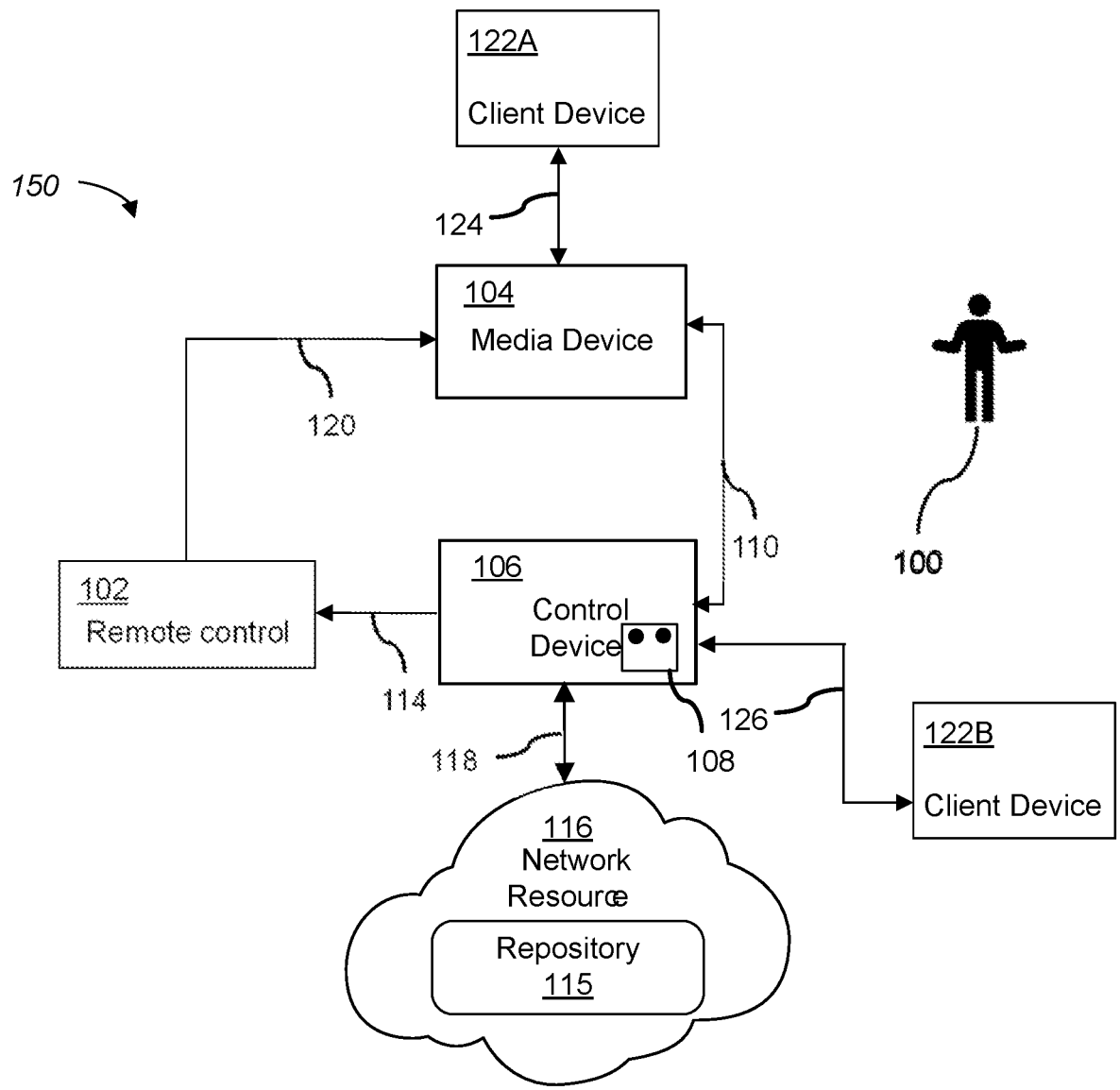
FIG. 1 illustrates a user environment, according to one or more aspects of the present disclosure.

FIG. 1 illustrates a user environment 150, according to one or more aspects of the present disclosure. The user environment 150 can comprise any of one or more client devices 122, a media device 104, a control device 106, a remote control device 102, a network resource 116, and any other network device, or any combination thereof. A user 100 within the user environment 150, for example, a home or office, can use a remote control device 102 to operate a media device 104. A media device 104 can comprise a television (TV), an audio/video receiver (AVR), any type of multi-media playback device, or any combination thereof. The media device 104 can comprise an audio input/output, for example, one or more audio elements, such as any of a sound bar that comprises an audio output device 105 (such as a speaker) and/or an audio receiver device (such as a microphone), any other audio I/O device, or a combination thereof. The audio I/O device can be included within and/or coupled to the media device 104. The media device 104 can receive media content from a client device 122, such as client device 122A, via a connection 124, a control device 106, via a connection 110, a client device 122B via a connection 126 to the control device 106, any other device via any other connection, or any combination thereof.

A connection 110 connects control device 106 to the media device 104. For example, the connection 110 can comprise an HDMI connection. Control device 106 can comprise any of a set-top box, a cable modem, any other type of device for receiving and/or directing media content, or any combination thereof. The control device 106 can comprise an audio output device, for example, a speaker, an audio receiver device, for example, a microphone, or both. The audio receiver device can receive audio content output from the audio I/O device, for example, audio output device, and use that received audio content to verify configuration of the remote control device 102, for example, audio content associated with a test audio content from the control device 106. The control device 106 can be communicatively coupled to the remote control device 102 via a wireless connection 114 and to a network resource 116 via a connection 118.

The network resource 116 can be any of a database, a uniform resource locator (URL), a webpage, any cloud-based storage, a server, any other type of repository, or any combination thereof. The network resource 116 can store or provide access to a repository that comprises the current active source input, the previous active source input, a plurality of source inputs available to the media device 104, any other source input setting or parameter associated with a media device 104, or any combination thereof. For example, the control device 106 can send the active source input (or an identifier associated with the active source input) to the repository 115 and when the active source input is changed to a different active source input, the control device 106 can send an update to the repository 115 such that the previous source input is set to the active source input selected prior to the switch to the different active source input as the active source input.

The remote control device 102 can be communicatively coupled to the media device 104 by way of a wireless connection 120. For example, the wireless connection 120 can comprise an IR control signal for controlling, altering, and/or changing one or more functions and/or settings associated with the media device 104, such as one or more key sequences that cause the media device 104 to switch to a different source input as the active source input. In one or more embodiments, the remote control device 102 is within or part of the control device 106.

Many times a user 100 has an unsatisfactory experience with operation of a media device 104 due to the active source input being autonomously switched to a different source input based on media content received from a client device connected to the network, for example, to a control device 106. For example, a user 100 can be viewing media content on the media device 104 when content is received from another device in the user environment 150, such as a client device 122A and/or 122B, collectively referred to as client device(s) 122. The client device 122 can cause the active source input to change to a source input that is associated with the client device 122 such that the source input associated with the client device 122 becomes the active source input (or current active source input) of the media device 104. For example, the client device 122B via a connection 126 can send media content to the control device 106 and the control device 106 can transmit an instruction or command to the media device 110 for the media device 110 to change the active source input to a selected source input that is associated with the client device 122B so that the media content from client device 122B can be presented by the media device 104. As another example, the client device 122A can transmit the media content via a connection 124 to the media device 104. The media device 104 can change or switch the active source input to a source input associated with the client device 122A. The media device 104 can publish the current active source input (the active source input that the media device has switched or changed the active source input to) such that the control device 106 is made aware of the current active source input. That is, whenever another HDMI-CEC enabled device causes the media device 104 to change the active source input, any listening device, such as the control device 106, will be able to explicitly determine which source input and/or port has become the active source input for the media device 104.

Figure 2:
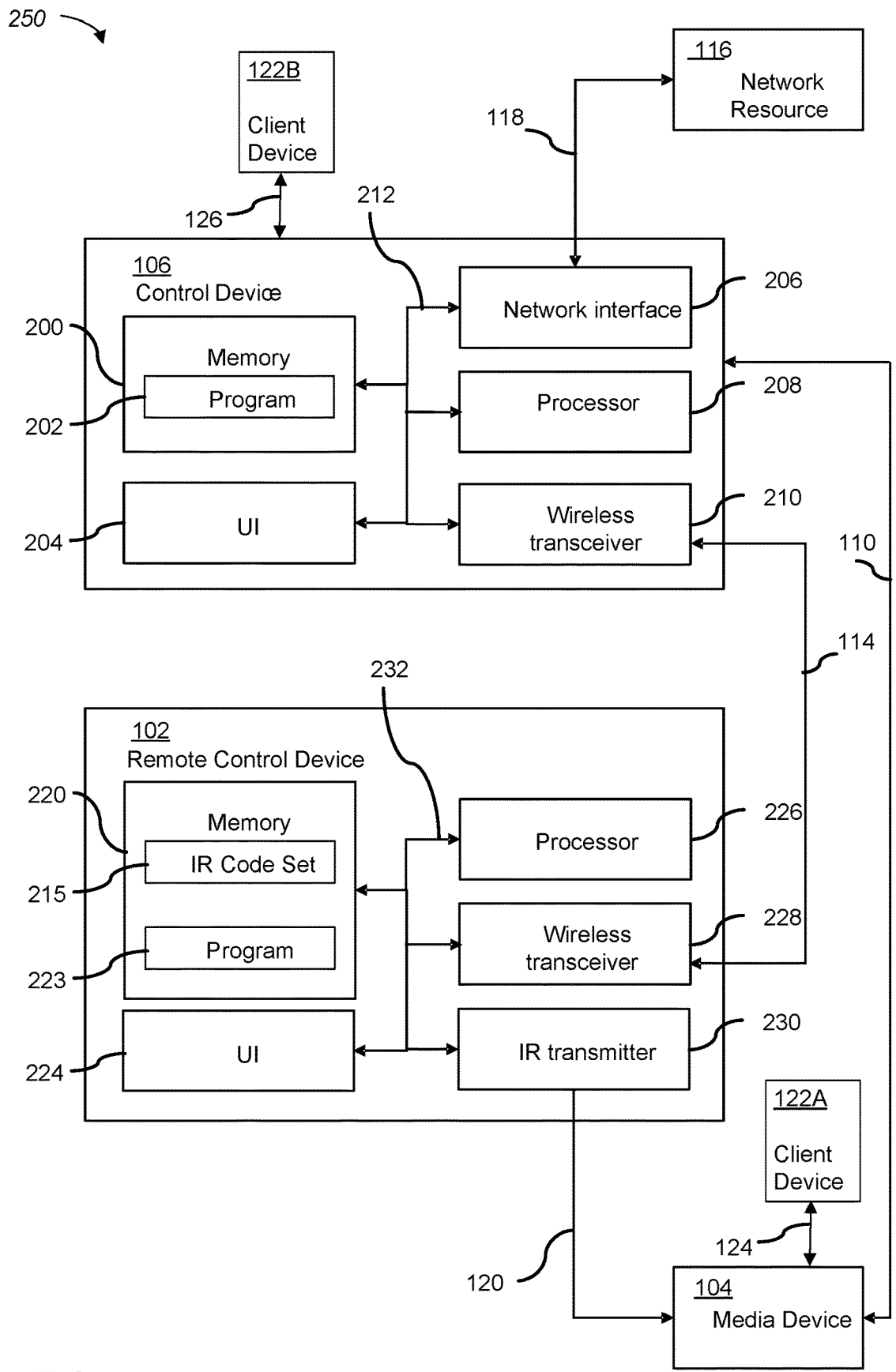
FIG. 2 illustrates a network environment for controlling an active source input associated with a media device, according to one or more aspects of the present disclosure.

FIG. 2 illustrates a network environment 250 for controlling an active source input associated with a media device 104, according to one or more aspects of the present disclosure. For example, the network environment 250 provides more detail of one or more components of the user environment 150. The network environment 250 comprises a remote control device 102, a media device 104, a control device 106, and a network resource 116. A connection 110 connects media device 104 and control device 106. Wireless connection 114 connects control device 106 and remote control device 102 and a wireless connection 120 connects remote control device 102 and media device 104. In one or more embodiments, connection 114 and 120 comprise an IR signal. The control device 106 can communicate to network resource 116 via connection 118.

In one or more embodiments, control device 106 may be any device or system that is configured to perform a function, and/or communicate with network resource 116, media device 104, and remote control device 102. In one or more embodiments, remote control device 102 may be any device or system that is configured to communicate with media device 104 over wireless connection 120 and receive one or more program code sets 115 from control device 106 over the wireless connection 114. The remote control device 102 can be a stand-alone remote control device or unit (RCU) associated with any one or more consumer electronic devices, such as any of a television, a video playback device, a video recorder, a DVD player, a Blu-ray player, a video streaming players, a STB, a sound bar, a wireless speaker, a smart media device, a gaming console, or any combination thereof. In one or more embodiments, the remote control device 102 can be a universal remote.

Network resource 116 can be any device or system that is configured to store, process, and communicate information. While network resource 116 is depicted as a single device external to the control device 106, the present disclosure contemplates that the network resource 116 can comprise a plurality of devices disposed at or about one or more locations.

Connection 118 may be any type of communication channel that facilitates communications between devices or networks, such as network resource 116 and a network interface 206 of a control device 106. Connection 118 may comprise physical media or wiring, such as coaxial cable, optical fiber, or digital subscriber line (DSL), wireless links, such as wireless fidelity (Wi-Fi), long term evolution (LTE), satellite, terrestrial radio links, or a combination of any of these examples or their equivalents. The term "Wi-Fi" as used herein may be considered to refer to any of Wi-Fi 4, 5, 6, 6E networks, or any variation thereof. The data communicated over connection 118 can be implemented using a variety of protocols on a network such as a wide-area network (WAN), a virtual private network (VPN), a metropolitan area network (MAN), a system area network (SAN), a data over cable service interface specification (DOCSIS) network, a fiber optics network (including fiber-to-the-home, fiber-to-the-X, or hybrid fiber-coax), a digital subscriber line (DSL), a public switched data network (PSDN), a global Telex network, or a 2G, 3G, 4G, 5G, 6G or 60G, for example. Though connection 118 is shown as a single link, the present disclosure contemplates that connection 118 can comprise multiple links and devices, including access points, routers, gateways, and servers.

Wireless connection 114 may be any type of wireless signal, such as any of an IR signal, a Bluetooth (BT) signal, a BLE signal, an RF4CE signal, any other wireless signal associated with any type of wireless connection, or a combination thereof.

The wireless connection 120 can comprise an IR signal, for example, that enables remote control device 102 to select, change and/or alter one or more functions of a media device 104 when the remote control device 102 is within a communication range of the media device 104. For example, an IR signal can be a low data-rate signal where one or more program code sets 115 for the media device 104 are modulated onto an infrared waveform, with, for example, carrier frequencies typically around 30-60 Kilohertz (kHz). The one or more functions can comprise any of a volume control, a channel selection, a source input selection, a trick-play control, any other setting, operation, and/or function associated with the media device 104, or any combination thereof.

Connection 110 may be analog or digital, uni- or bi-directional, and are typically based on standards used by consumer electronics devices. Non-limiting examples of connection 110 include HDMI, digital visual interface (DVI), DisplayPort, universal serial bus (USB), component video, S-Video, composite video, optical audio such as Toshiba link (TOSLINK), and analog audio.

Connections 124 and 126 can be any type of connection that allows media content to be delivered from a client device 122 to the media device 104. For example, any of connections 124 and 126 can be a wired or wireless connection that allows for communication between a client device 122 and the media device 104.

Control device 106 comprises a memory 200, a user interface (UI) 204, a network interface 206, a processor 208, and a wireless transceiver 210. Memory 200, UI 204, network interface 206, processor 208, and wireless transceiver 210 are connected by bus 212. While memory 200, UI 204, network interface 306, processor 308, and wireless transceiver 210 are illustrated as individual devices, the present disclosure contemplates that any of memory 200, UI 204, network interface 206, processor 208, wireless transceiver 210, or any combination thereof can be combined as a unitary device. The control device 106 can be a computer with memory 200 comprising a non-transitory computer-readable medium for carrying or having one or more computer-executable instructions or data structures stored thereon. Such non-transitory computer-readable medium refers to any computer program product, apparatus or device, such as a magnetic disk, optical disk, solid-state storage device, memory, programmable logic devices (PLDs), dynamic random access memory (DRAM), random access memory (RAM), read-only memory (ROM), erasable programmable read-only memory (EPROM), electrically erasable programmable read-only memory (EEPROM), compact disc read-only memory (CD-ROM) or other optical disk storage, magnetic disk storage or other magnetic storage devices, or any other medium that can be used to carry or store a computer-readable program code in the form of one or more instructions or data structures and that can be accessed by a general-purpose or special-purpose computer or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable medium. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable medium.

In one or more embodiments, a non-transitory tangible computer-readable medium such as memory 200 may be coupled to a processor, such as a processor 208, such that the processor may read information from, and write information to, the non-transitory tangible computer-readable medium. In one or more embodiments, a memory 200 or any other tangible computer-readable medium may be integral to processor 208. A processor 208 and the tangible computer-readable medium or memory 200 may reside in an integrated circuit (IC), an ASIC, or large scale integrated circuit (LSI), system LSI, super LSI, or ultra LSI components that perform a part or all of the functions described herein. In one or more embodiments, a processor 208 and a memory 200 can be discrete components.

In one or more embodiments, a tangible computer-readable medium can be coupled to one or more systems, such as a computer system/server, which is operational with numerous other general-purpose or special-purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Processor 208 is configured to execute a program 202 stored in a memory 200. A program 202 can include one or more instructions, that when executed by a processor 208, cause control device 106 to perform one or more operations of any one or more methods discussed herein; generate wireless signal 114 as a wireless instruction signal based on the primary device data; and transmit the wireless instruction signal to cause remote control device 106 to transmit a program code via the wireless connection 114 to instruct the media device 104 to change the active source input or to cause an IR signal, for example, to be transmitted via a connection 110 to instruct the media device 104 to change or alter the active source input. In or more embodiments, the program 202 includes additional instructions, that when executed by the processor 208, cause control device 106 and/or remote control device 102 to transmit a wireless instruction signal.

Network interface 206 may be any device or system that is configured to establish and maintain a connection 118. Network interface 206 may include one or more antennas and communicate wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols.

Remote control device 102 contains a memory 220, a UI 224, a processor 226, a wireless transceiver 228, and an IR transmitter 230. Memory 220, UI 224, processor 226, wireless transceiver 228, and IR transmitter 230 are connected by bus 232. Memory 220 includes a program code set 115 and a program 223 stored therein.

While memory 220, UI 224, processor 226, wireless transceiver 228, and IR transmitter 230 are illustrated as individual devices, the present disclosure contemplates that any of memory 220, UI 224, processor 226, wireless transceiver 228, IR transmitter 230, or any combination thereof can be combined as a unitary device. In one or more embodiments, at least one of memory 220, UI 224, processor 226, wireless transceiver 228, and IR transmitter 230 can be a computer with memory 220 comprising a non-transitory computer-readable medium for carrying or having one or more computer-executable instructions or data structures stored thereon similar to or the same as discussed above with respect to memory 200. Processor 226 is configured to execute a program 223 stored in a memory 220.

Processors 208 and 226 may each be any device or system that is configured to control general operations of control device 106 and remote control device 102, respectively, and include, but are not limited to, central processing units (CPUs), hardware microprocessors, single-core processors, multi-core processors, field-programmable gate arrays (FPGAs), microcontrollers, application-specific integrated circuits (ASICs), digital signal processors (DSPs), or other similar processing devices capable of executing any type of instructions, algorithms, or software for controlling the operations and functions of media device 104 and/or remote control device 102.

Memory 220 may be any device or system configured to store data and instructions used by control device 106 and remote control device 102 respectively, and include, but are not limited to, RAM, DRAM, hard drives, solid-state drives, ROM, EPROM, EEPROM, flash memory, embedded memory blocks in field programmable gate arrays (FPGAs), or any other various layers of memory hierarchy.

Wireless transceivers 210 and 228 may each be any device or system that is configured to establish and maintain wireless connection 114. In this non-limiting example, wireless transceivers 210 and 228 are radio transceivers or wireless communication circuits that implement wireless connections in accordance with any IR or Bluetooth protocols, Bluetooth Low Energy (BLE), or other short-range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

It should be noted that in accordance with aspects of the present disclosure, wireless transceivers 210 and 228 can wirelessly communicate in a manner different from IR transmitter 230. In one or more embodiments, wireless transceivers 210 and 228 wirelessly communicate in a protocol that is different from that as used by IR transmitter 230, for example, a frequency band that is different from that as used by IR transmitter 230.

UIs 204 and 224 may each be any device or configured to present information and accept user inputs on control device 106 and remote control device 102 respectively, and include, but are not limited to, liquid crystal displays (LCDs), thin film transistor (TFT) displays, light-emitting diodes (LEDs), touch screens, buttons, microphones, and speakers.

IR transmitter 230 may be any device or system that is configured to create and modulate infrared waveforms that can be used to control media device 104. In one or more embodiments, IR transmitter 230 can be an LED system that comprises an LED and one or more associated circuits.

Bus 212 may be any device or system that is configured to provide data communications between memory 200, UI 204, network interface 206, processor 208, and wireless transceiver 210 of control device 106. Bus 232 may be any device or system that is configured to provide data communications between memory 220, UI 224, processor 226, wireless transceiver 228, and IR transmitter 230 of remote control device 102. Buses 212 and 232 may be one or more of any of several types of bus structures, including a memory bus or a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Program 202 comprises one or more computer-readable instructions that when executed by a processor 208 of control device 106 cause the control device 106 to perform one or more operations, including communicating with network resource 116 and remote control device 102, processing user inputs, and generating instructions and/or commands. Program 202, having at least one program module, can be stored in memory 200 and by way of example, and not limitation, can comprise as well as an operating system, one or more application programs, other program modules, and program data. Similarly, program 223 comprises one or more computer-readable instructions that when executed by a processor 226 of remote control device 102 cause the remote control device 102 to perform one or more operations. The program 223, having at least one program module, can be stored in memory 220 and by way of example, and not limitation, can comprise an operating system, one or more application programs, other program modules, and program data. Each of the operating systems, one or more application programs, other program modules, and program data or some combination thereof, may include an implementation of a networking environment. The program modules generally carry out the functions and/or methodologies of various embodiments of the disclosure as described herein.

A program code set 215 is a non-limiting example of a data structure that comprises one or more program codes associated with media device 104, for example, one or more IR codes. The one or more program code sets 215, can control one or more functions of the media device 104 including, but not limited to, a toggle power function, a volume control function, a switch, select, alter, or otherwise change from and/or to a source input (such as to change the active source input), any other function associated with the media device 102, and any combination thereof. The remote control device 102 can be configured with a program code set 115 by the control device 106. The control device 106 can store one or more program code sets 215 for each of a plurality of media devices 104 in a memory 200 and/or any one or more program code sets 215 for a specific media device 104 can be retrieved from a network resource 116.

For purposes of discussion and referring to FIG. 2, suppose that user 100 is using media device 104 for viewing media content from a cable provider via the control device 106 (such as a STB). The control device 106 is associated with a source input of the media device 104. This source input associated with receiving media content from a cable provider via the control device is selected as the active source input of the media device 104. A client device 122A can receive a call which is detected by the control device 106. The control device 106 can store the current active source input (or send the current active source input to a repository 115 to store) as a previous active source input and then send an instruction or command to the media device 104 to change the active source input to a source input that is associated with the client device 122A so that the media device 104 can present the call (or media content) received at the client device 122A. When the call is completed or the media content from the client device 122A otherwise terminated, the control device 106 can go through a process or returning the active source input to the previous active source input without user intervention, according to one or more aspects of the present disclosure.

Figure 3:
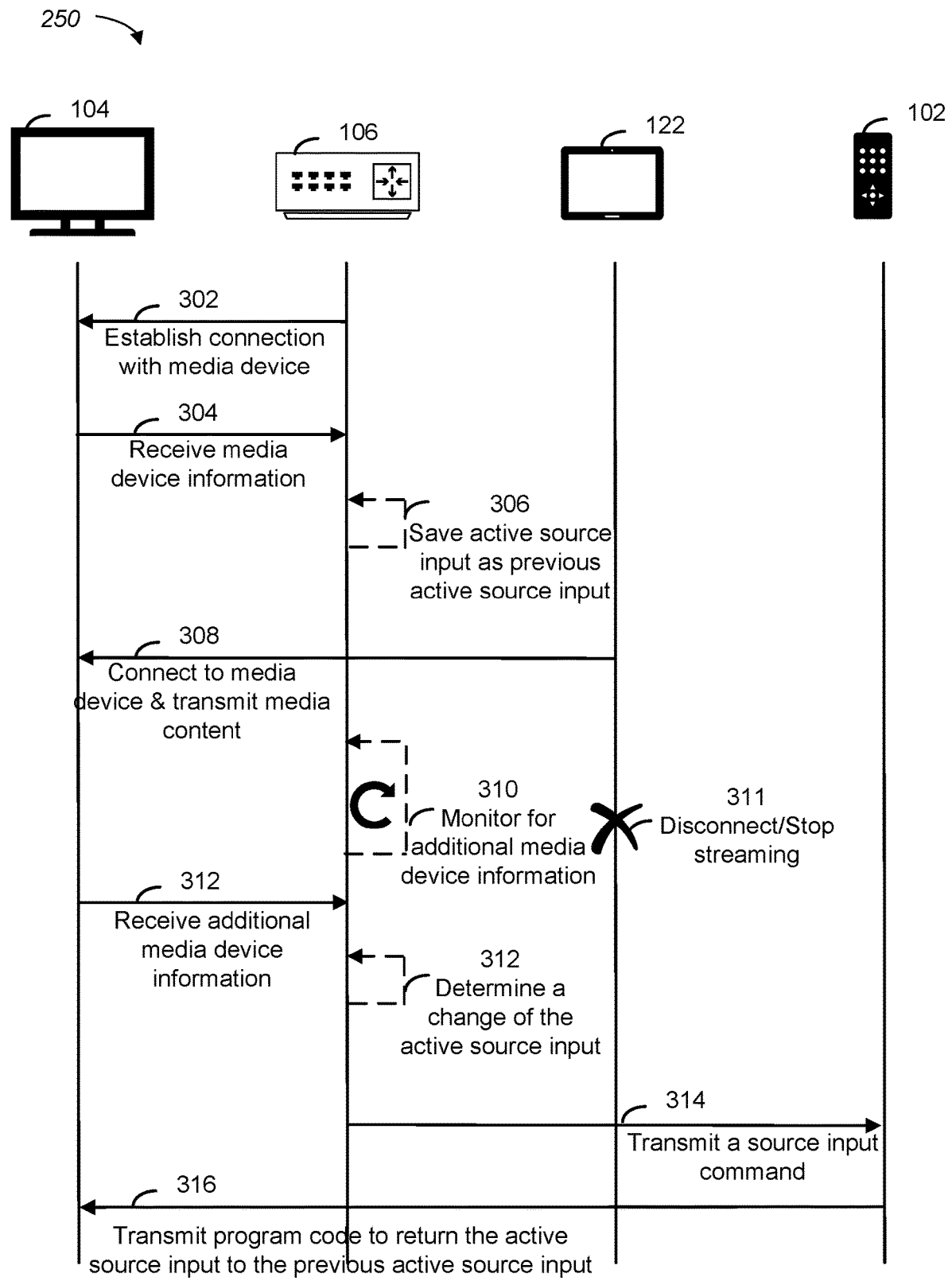
FIG. 3 illustrates a method of selecting an active source input of a media device, according to one or more aspects of the present disclosure.

FIG. 3 illustrates a method of selecting an active source input of a media device 104, according to one or more aspects of the present disclosure, for example, a user environment 150 and/or a network environment 250. The control device 106 at 302 establishes a connection with a media device 104. At 304, the control device 106 receives media device information associated with the media device 104. For example, the control device 106 can receive device-specific information (such as make, model, manufacturer, etc.), one or more communication protocols accepted by the media device 104, one or more source inputs available at (or associated with) the media device 104, an active source input, any other information, or any combination thereof.

At step 306, the control device 106 saves the active source input received from the media device 104 as the previous active source input. For example, the control device 106 can save the active source input as the previous active source input in a memory 200, a repository 115, or both. The control device 106 can continue to monitor for any changes to a source input at the media device 104. For example, any HDMI-CEC enable device connected to the media device 104 can listen for changes from the current active source input to a new active source input at the media device 104.

At 308, a client device 122 connects to the media device 104. Connection of the client device 122 to the media device 104 may not cause any changes to one or more functions or operations at the media device 104, for example, the client device 122 upon connection does not immediately begin transmission of media content. At 310, the control device 106 monitors or listens for additional media device information, such as a change in the active source input from a current active source input to a new active source input. For example, client device 122 can be an IoT device that receives media content, such as a video call. The media content can be communicated to the media device 104 for presentation at the media device 104 via a direct connection and/or an indirect connection, such as via the control device 106. When the media device 104 receives the media content from the client device 122, the media device 104 can switch or change the active source input to a source input associated with the client device 122. The control device 106 stores the previous active source input and tracks or continues to monitor the media device 104 for additional media device information.

At 311 the video call ends or otherwise terminates at the client device 122 such that no media content is received at the media device 104 from the client device 122 (such as the client device 122 stops streaming media content) and/or the client device 122 disconnects from the media device 104, the control device 106 can receive additional media information indicative of the disconnection of the client device 122, cessation or termination of the streaming of the media content (such as the video call ending), or any other changed based on media device information from the media device 104.

At 314, the control device 106 can transmit a source input instruction or command to the remote control device 102. The instruction or command can comprise one or more program codes associated with a source input of the media device 104. The remote control device 102 at 316 can transmit a program code to the media device 104 to cause the media device to increment and/or decrement the source input from the active source input to a different or new active source input until the active source input is returned to the previous active source input from 306. While FIG. 3 illustrates a separate remote control device 102, the current disclosure contemplates that the control device 106 comprises a remote control device 102. The remote control device 102 can comprise, for example, an IR blaster 108 that can transmit the program code associated with the instruction or command for changing the active source input to a different source input.

FIGS. 4A-4D illustrate returning an active source input, for example, of a media device 104, from a current source input to a previous source input, according to one or more aspects of the present disclosure. A media device 104 can allow for a plurality of source inputs 410 from which the media device 104 can receive media content for presentation at the media device 104. The plurality of source inputs 410 can each be associated with a source input identifier 402. The source identifier 402 can be associated with a source input name 404. Each of the source input identifiers 402 and/or source input names 404 can be associated with an active source input parameter 406 that indicates whether the associated source input identifier 402 is currently the active source input for the media device 104. While FIGS. 4A-4D illustrate eight different source inputs 410, the present disclosure contemplates that any number of source inputs 410 can be associated with any given media device 104.

FIG. 4A illustrates an exemplary plurality of source inputs 410. As indicated in FIG. 4A, the coaxial digital source input 404 associated with source input identifier "2" is selected as the active source input 406 for a media device 104. The control device 106 stores the active source input as the previous source input, for example, source input identifier 402 associated with the coaxial digital source input 404 is stored. The client device 122 is communicatively coupled to the media device 104 via a direct/indirect wired/wireless connection, such as via a control device 106. The client device 122 (for example, an IoT device such as a smartphone) receives media content (such as a video call), and directs the media content to the media device 104.

FIG. 4B illustrates that the active source input from FIG. 4A has been changed to a current active source input associated with HDMI2 source input 404 with a source input identifier 402 of "4". The active source input 406 is now the source input 410 associated with the source input identifier "4". For example, the previous active source input is indicated as source input identifier "2" associated with the coaxial digital source input 404 from FIG. 4A and the active source input has been changed from source input identifier "2" from FIG. 4A to the current active source input "4" from FIG. 4B. As indicated in FIG. 4B, the client device 122 can terminate the streaming or transmission of media content to the media device 104, for example, the video call is terminated at the client device 122.

FIG. 4C illustrates, for example, a process of returning the active source input 406 to the previous source input from FIG. 4A. The control device 106 determines that the previous active source input is associated with the source input identifier of "2". As illustrated in FIG. 4C, the control device 106 can cause the active source input selected 406 to change to a next source input identifier 402. For example, the active source input 406 from FIG. 4B is associated with the source input identifier 402 of "4". The control device 106 can cause a source input identifier 402 to be incremented to the source input identifier 402 associated with the VGA source input name 404, for example, a source input identifier of "5". While an increment process is illustrated, the present disclosure contemplates that the control device can cause the active source input to decrement to a previous source input identifier 402. In one or more embodiments, the control device 106 can determine whether to increment or decrement based on the proximity of the previous active source input to the active source input. For example, the control device 106 can determine the quickest path or the fewest instructions required (whether by incrementing or decrementing) to reach the source input associated with previous active source input based on, for example, a source input identifier 402 associated with the active source input. In FIG. 4C, the active source input is incremented from a source identifier 402 of "4" to a source identifier 402 of "5" such that the source input associated with the source input name 404 of VGA is selected as the active source input 406. That is, the previous active source input to be reached is associated with a source input identifier 402 of "2", the active source input 406 that the process of FIG. 4C started from was associated with a source input identifier 402 of "4", and the new source input selected due to the increment is a source input identifier 402 of "5".

FIG. 4D illustrates the final increment process to achieve selection of the previous active source input as the active source input 406. For example, the previous active source input is associated with a source input identifier 402 of "2" as noted in FIG. 4A. The control device 106 causes the media device 104 to cycle through the plurality of source inputs until the previous active source input is reached. For example, a key sequence received at the media device 104 from a remote control device 102 that is external to or internal to the control device 105 can cause the active source input to be incremented from the "HDMI2" source input name 404 associated with a source input identifier 402 of "4" to the "VGA" source input name 404 associated with the source input identifier 402 of "4", from the "VGA" source input to the "Ethernet" source input name 404 associated with the source input identifier 402 of "6", from the "Ethernet" source input to the "DVI" source input name 404 associated with the source input identifier 402 of "7", from the "DVI" source input to the "Component" source input name 404 associated with the source input identifier 402 of "8", from the "Component source input to the "Antenna In" source input name 404 associated with the source input identifier 402 of "1" and finally from the "Antenna In" source input to the "Coaxial Digital" source input name 404 associated with the source input identifier 402 of "2". After cycling or incrementing through the various source inputs, the active source input is finally changed from the source input identifier 402 of "4" to the new active source input (the source input identifier 402 of "2") which is the previous active source input from FIG. 4A. The active source input 406 is selected to be this new active source input of "2" in FIG. 4D such that the active source input 406 is returned to the previous active source input from FIG. 4A. In this way, the process does not require that a user 100 make any selections, for example, no intervention by a user 100 is required to return the active source input to the previous active source input. While FIGS. 4A-4D illustrate an increment of an identifier associated with the source input, the present disclosure contemplates that cycling through the plurality of source inputs associated with a media device 104 to reach the previous active source input can be via incrementing or decrementing an identifier, such as the source input identifier 402.

Figure 5:
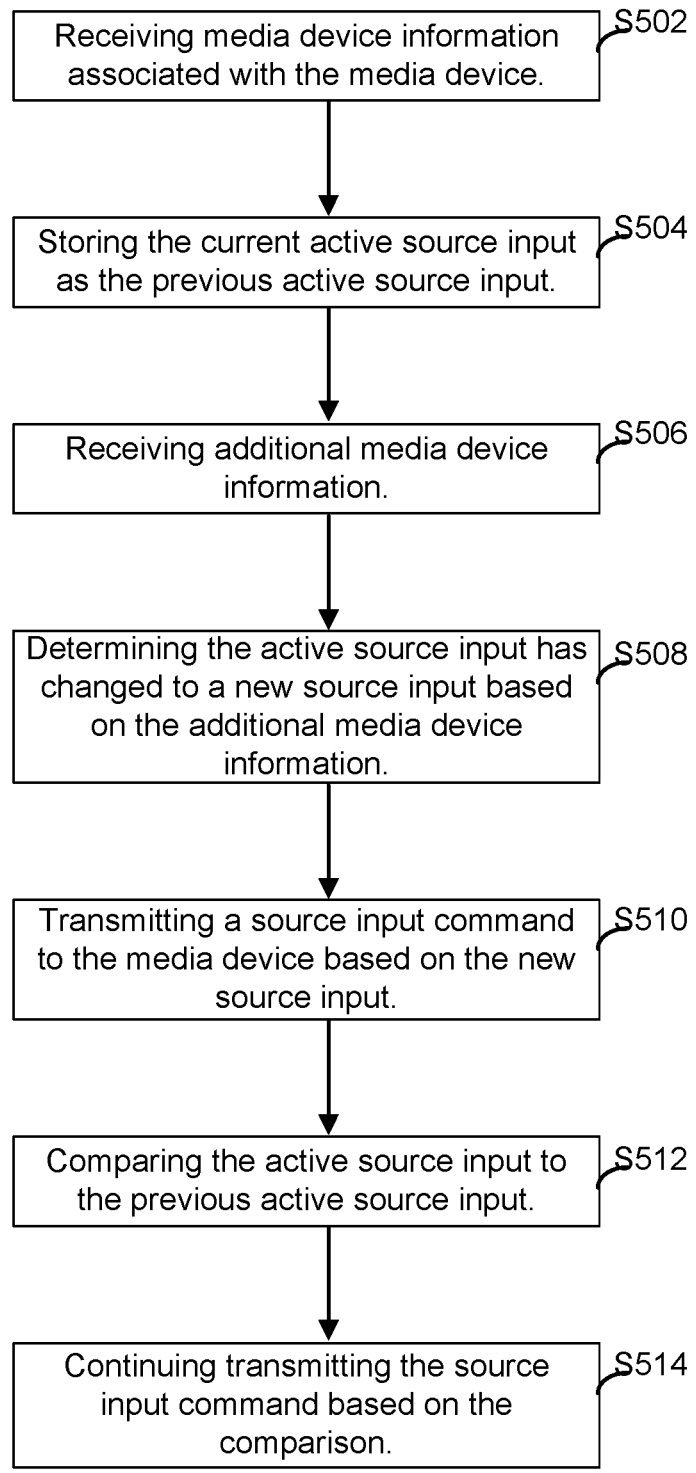
FIG. 5 is a flow chart illustrating a method for controlling an active source input of a media device, according to one or more aspects of the present disclosure.

FIG. 5 is a flow chart illustrating a method of a control device 106 to return an active source input of a media device 104 from a current active source input to a previous active source input, according to one or more aspects of the present disclosure. For example, control device 106 can monitor the source input selection at a media device 104 so that if the active source input is switched due to media content from a client device 122, the active source input can be returned to the source input that was previously selected (the previous active source input) before interruption by the media content from the client device 122. The control device 106 can be programmed with one or more computer-readable instructions such as a software or program 202 that when executed by a processor or controller 208 cause the control device 106 to transmit one or more instructions and/or one or more commands to change or return the active source input of the media device 104 to the previous active source input. In FIG. 5, it is assumed that any one or more of the control device 106, the media device 104, and/or the remote control device 102 include their respective controllers and their respective software stored in their respective memories, as discussed above in connection with FIGS. 1, 2, 3, 4A, 4B, 4C and 4D, which when executed by their respective controllers perform the functions and operations in accordance with the example embodiments of the present disclosure (for example, including sending one or more instructions from a remote control device 102 included within or connected to the control device 106). While the steps S510-S514 are presented in a certain order, the present disclosure contemplates that any one or more steps can be performed simultaneously, substantially simultaneously, repeatedly, in any order or not at all (omitted).

A control device 106 can be disposed within proximity of a media device 104 such that the control device 106 is connected to the media device 104 so as to provide media content (such as multi-media content including, but not limited to, programming received from a cable operator and/or service provider) to the media device 104. For example, the control device 106 can be connected to the media device 104 via an HDMI connection. A remote control device 102 can be disposed within proximity of the media device 104 and the control device 106 such that the media device 104 can receive one or more wireless signals from the remote control device 102 and the control device 106 can transmit one or more wireless signals to the remote control device 102. In one or more embodiments, the remote control device 102 is part of or included within the control device 104.

At step 502, the control device 106 receives media device information from the media device 104. The media device information is associated with the media device 104. For example, the media device information can comprise a current active source input of a plurality of source inputs of the media device 104. A media device 104 can communicate the current active source input based on various activities or occurrences, such as when a new client device 122 connects to or establishes a communication with the media device 104 As illustrated in FIGS. 4A-4D, a media device 104 can include a plurality of source inputs that allow for receiving media content from any number of devices that communicate and/or are coupled to the media device 104 via at least one of the plurality of source inputs. For example, the media device 104 can have a plurality of HDMI source inputs and a first HDMI source input of the plurality of HDMI source inputs can be the current active source input such that the media device 104 receives media content from the first HDMI source input.

At step 504, the control device 106 stores the current active source input as the previous active source input. The control device 106 can store the previous active source input locally in a memory or remote at a network resource. At step 506, the control device 106 can receive from the media device 106 additional media device information. For example, while the media device 104 is presenting or displaying the media content from the first HDMI source input, another client device 122, such as an IoT device, can receive a video conference request. The IoT device or the control device 106 can request that the media device 104 change the active source input of the media device 104 to the source input associated with the IoT device. The media device 104 can broadcast that the active source input has changed to the source input associated with the IoT device, for example, as part of additional media device information that is received by the control device 106.

At step 508, the control device 106 determines that the active source input has changed to a new source input based on the additional media device information. This additional media device information comprises the new source input as the active source input. For example, the additional media device information can be received by the control device 106 as part of an HDMI-CEC exchange and/or HDMI-CEC protocol.

At step 510, the control device 106 transmits a source input command to the media device 104 based on the new source input. The source input command can be transmitted using an infrared blaster associated with, integral to or otherwise connected to the control device 104. At step S512, the control device 106 compares the active source input of the media device 104 to the previous active source input, for example, stored at step S504. For example, the control device 106 can determine that the first HDMI source input is no longer receiving the video conferencing media content. The control device 106 can determine the active source input based on, for example, the additional media information. The control device 106 can send a source input command to the media device 104 that causes the media device 104 to change to another source input, such as discussed with reference to FIGS. 4A-4D. For example, the control device 106 can cause an identifier associated with an source input of the plurality of source inputs to be incremented or decremented. The source input command can comprise a key sequence that causes the media device 104 to change the active source import, such as a key sequence that causes the media device 104 to increment and/or decrement the identifier. A remote control device 102 can be coupled to the control device 106 can receive the source input command and transmit the key sequence to the media device 104 based on the source input command.

At step S512, the active source input (the current source input) is compared to the previous active source input. For example, as part of an HDMI-CEC exchange, the control device 106 can media device information that indicates the active source input (a current active source input) of the media device 104. At step S514, the control device 106 continues to transmit the source input command based on the comparison at step S512. For example, the control device 106 can continue to send a source input command that increments or decrements an identifier associated with the plurality of source inputs associated with the media device 104 until the comparison from step S512 indicates that the active source input is the same as the previous active source input. In this way, the active source input is returned to the previous source input autonomously so that the user experiences an improved experience. For example, the user does not have to manually go through a menu system of the media device 104 to revert back to the original media content that was being presented via the first HDMI input source.

Televisions are a common consumer electronic device in many households and offices, and each TV is often attached to other consumer electronics devices such as STBs, video disc players, video streaming players, smart speakers, and gaming consoles. Many consumer electronic devices are accompanied by their own remote control devices, resulting in a scenario where multiple remote control devices must be operated in order to accomplish a user intention. Several existing products, such as universal remotes and IR blasters, attempt to simplify this problem. However, universal remotes and IR blasters can themselves be complex to set up and use. In accordance with the present disclosure, a control device is used with a remote control device to control one or more functions of a media device. The remote control device is programmed autonomously using a program code set transmitted by the control device. The program control set is verified by the remote control device to ensure that the program control set will control the one or more functions of the media device.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A control device to return an active source input of a media device to a previous active source input of the media device, the control device comprising:
   a memory; and
   a processor configured to execute one or more instructions stored on the memory to cause the control device to:

receive, from the media device, media device information associated with the media device, wherein the media device information comprises a current active source input of a plurality of source inputs of the media device, wherein the plurality of source inputs can receive media content for presentation on the media device;

store the current active source input as the previous active source input;

receive, from the media device, additional media device information;

determine the active source input has changed to a new source input based on the additional media device information, wherein the additional media device information comprises the new source input as the active source input;

transmit a source input command to the media device based on the new source input, wherein the source input command causes the media device to return the active source input to the previous active source input;

compare, after transmitting the source input command, the active source input to the previous active source input; and continue transmitting the source input command until the comparison of the active source input to the previous active source input indicates that the active source input is the previous active source input.

2. The control device of claim 1, wherein the source input command comprises a key sequence that causes the media device to change the active source input by incrementing or decrementing an identifier associated with the plurality of source inputs of the media device.

3. The control device of claim 2, wherein a remote control device coupled to the control device receives the source input command and transmits the key sequence to the media device.

4. The control device of claim 2, wherein the processor is further configured to execute the one or more instructions to further cause the control device to:

determine whether to increment or decrement the identifier based on a proximity of the active source input to the previous active source input.

5. The control device of claim 1, wherein the media device information is based on a client device connecting to or establishing a communication with the media device.

6. The control device of claim 1, wherein the control device comprises an infrared blaster that transmits the source input command to the media device.

7. The control device of claim 1, wherein the control device is a high-definition multimedia interface (HDMI) consumer electronics control (CEC) enabled device.

8. A method of a control device to return an active source input of a media device to a previous active source input of the media device, the method comprising:

receiving, from the media device, media device information associated with the media device, wherein the media device information comprises a current active source input of a plurality of source inputs of the media device, wherein the plurality of source inputs can receive media content for presentation on the media device;

storing the current active source input as the previous active source input;

receiving, from the media device, additional media device information;

determining the active source input has changed to a new source input based on the additional media device information, wherein the additional media device information comprises the new source input as the active source input;

transmitting a source input command to the media device based on the new source input, wherein the source input command causes the media device to return the active source input to the previous active source input;

comparing, after transmitting the source input command, the active source input to the previous active source input; and continuing transmitting the source input command until the comparison of the active source input to the previous active source input indicates that the active source input is the previous active source input.

9. The method of claim 8, wherein the source input command comprises a key sequence that causes the media device to change the active source input by incrementing or decrementing an identifier associated with the plurality of source inputs of the media device.

10. The method of claim 9, wherein a remote control device coupled to the control device receives the source input command and transmits the key sequence to the media device.

11. The method of claim 9, the method further comprising:

determining whether to increment or decrement the identifier based on a proximity of the active source input to the previous active source input.

12. The method of claim 8, wherein the media device information is based on a client device connecting to or establishing a communication with the media device.

13. The method of claim 8, wherein the control device comprises an infrared blaster that transmits the source input command to the media device.

14. The method of claim 8, wherein the control device is a high-definition multimedia interface (HDMI) consumer electronics control (CEC) enabled device.

15. A non-transitory, computer-readable medium of a control device having one or more computer-readable instructions stored thereon, that when executed by a processor cause the control device to perform one or more operations comprising:

receiving, from the media device, media device information associated with the media device, wherein the media device information comprises a current active source input of a plurality of source inputs of the media device, wherein the plurality of source inputs can receive media content for presentation on the media device;

storing the current active source input as the previous active source input;

receiving, from the media device, additional media device information;

determining the active source input has changed to a new source input based on the additional media device information, wherein the additional media device information comprises the new source input as the active source input;

transmitting a source input command to the media device based on the new source input, wherein the source input command causes the media device to return the active source input to the previous active source input;

comparing, after transmitting the source input command, the active source input to the previous active source input; and continuing transmitting the source input command until the comparison of the active source input to the previous active source input indicates that the active source input is the previous active source input.

16. The non-transitory, computer-readable medium of claim 15, wherein the source input command comprises a key sequence that causes the media device to change the active source input by incrementing or decrementing an identifier associated with the plurality of source inputs of the media device.

17. The non-transitory, computer-readable media of claim 16, wherein a remote control device coupled to the control device receives the source input command and transmits the key sequence to the media device.

18. The non-transitory, computer-readable medium of claim 16, wherein the one or more computer-readable instructions when further executed by the processor cause the control device to perform one or more further operation comprising:

determining whether to increment or decrement the identifier based on a proximity of the active source input to the previous active source input.

19. The non-transitory, computer-readable media of claim 15, wherein the media device information is based on a client device connecting to or establishing a communication with the media device.

20. The non-transitory, computer-readable media of claim 15, wherein at least one of:

the control device comprises an infrared blaster that transmits the source input command to the media device; and the control device is a high-definition multimedia interface (HDMI) consumer electronics control (CEC) enabled device.

* * * * *